Feb. 15, 1966 W. J. STROH 3,235,659
CONTROL SYSTEM
Filed Nov. 19, 1962
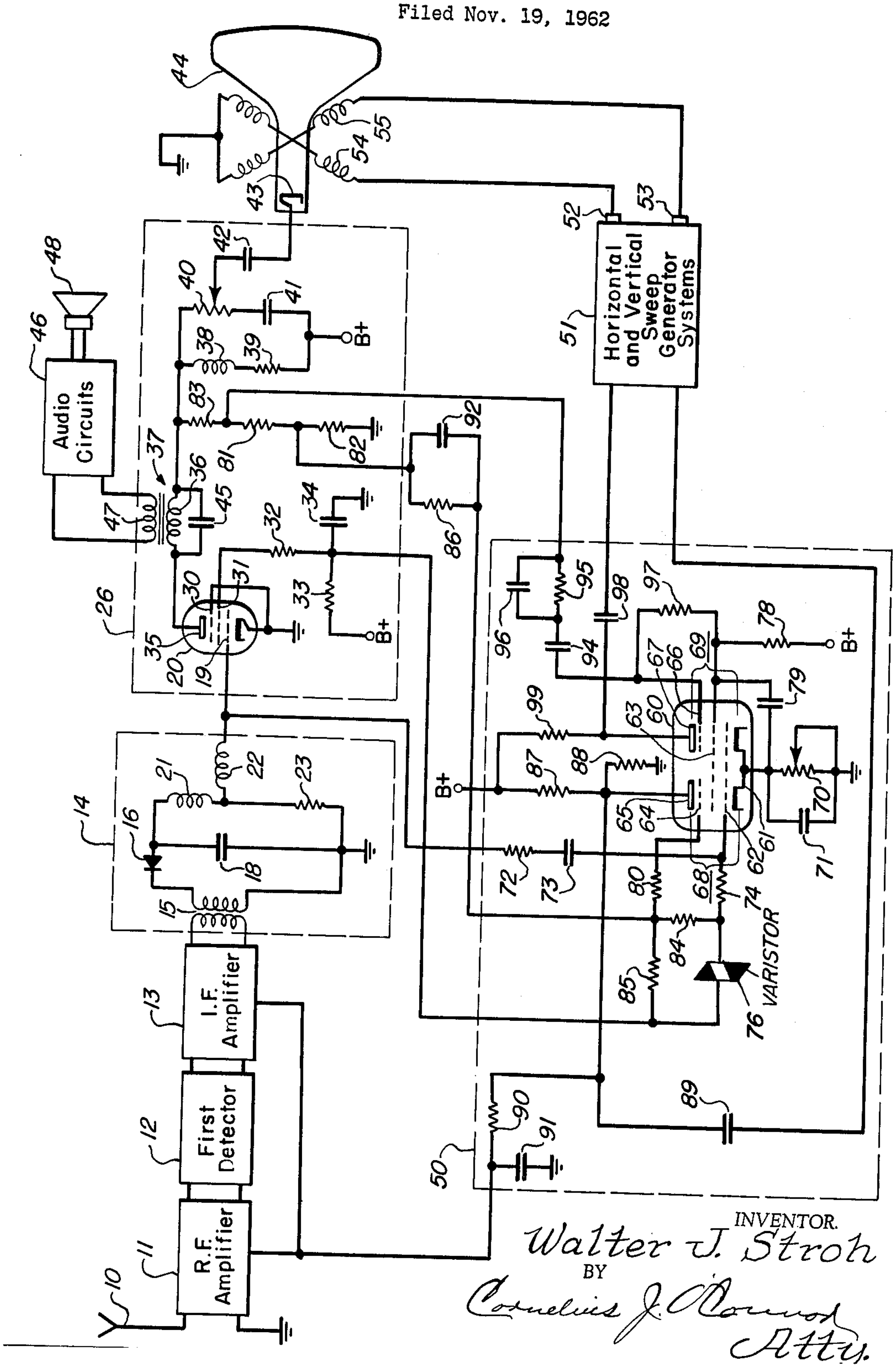
INVENTOR.
Walter J. Stroh
BY
Cornelius J. O'Connor
Attys.

United States Patent Office 3,235,659

Patented Feb. 15, 1966

3,235,659
CONTROL SYSTEM

Walter J. Stroh, Barrington, Ill., assignor to Zenith Radio Corporation, Chicago, Ill., a corporation of Delaware Filed Nov. 19, 1962, Ser. No. 238,681
7 Claims. (Cl. 178—7.3)

This invention relates in general to a control system and finds particular application in an automatic gain control system for a television receiver.

The function of an automatic gain control system (AGC), of course, is to maintain the signal level to the detector within predetermined narrow limits regardless of changes in the strength of received signals. In a television receiver, the AGC voltage is conventionally derived by integrating a series of pulses derived from the synchronizing signal components of the composite video signal since the sync components, unlike the video content of that signal, represent a constant percent amplitude of the carrier. Thus any change in the amplitude of the sync components is indicative of a change in received signal strength. Actually, sync amplitude is approximately 100% of the carrier and, consequently, any noise pulses accompanying the received signal but of greater intensity than the carrier will also be integrated and adversely affect the AGC operation. To avoid this result it has been proposed that provision be made for discriminating against noise pulses in the AGC system.

A particularly attractive AGC system of this type, combined with a noise immune sync separating system, is described and claimed in Patent 2,915,583 which issued to Robert Adler et al. and is assigned to the same assignee as the present invention. In such a system noise is effectively cancelled by applying positive-polarity and negative-polarity composite video signals in time coincidence to a pair of control grids disposed across the electron stream of a multi-grid noise clipper tube.

Under normal operating conditions, the strength of the received signal can be expected to vary over a certain range and the AGC system can be designed to accommodate that range. In the above-mentioned Adler et al. arrangement, this range is accommodated by a manually adjustable impedance in the biasing circuit of the noise-gating control grid of the clipper tube, that is, the grid which receives the negative-polarity signal. This impedance permits setting the operating bias of the noise-gating grid to afford maximum noise protection. It has been found, however, that when the system is adjusted for maximum noise protection under weak signal conditions, the AGC system may become paralyzed if the receiver is tuned from a weak signal channel to a strong signal channel because the signal on the gating grid may be strong enough to bias the AGC tube to cut-off. When this occurs, there is no control signal from the AGC system and the amplifier stages of the receiver operate at maximum gain, maintaining the output of the signal detector sufficiently high to bias subsequent stages to cut-off so that the receiver is, in effect, disabled.

Of course, in a combined AGC and sync separator system of the type under consideration, the gating grid is common to the sync separator and to the AGC system and therefore the paralysis condition also deprives the receiver of sync information.

In Patent 3,005,870, issued to Donald W. Ruby et al. and assigned to the same assignee as the present invention, this situation is overcome to some degree by returning the noise gating grid to the screen electrode of the video amplifier. With this connection if the negative-polarity output from the detector tends to drive the video amplifier to cut-off, the screen voltage rises and increases the bias of the noise-gating grid in a positive direction to offset the effect of the negative going composite video signal applied to that grid from the video detector. In some instances, even this arrangement fails to completely offset the effect of a strong signal.

It is therefore a principal object of the invention to provide a new and improved control system for a television receiver.

It is another object of the invention to provide a self-adjusting automatic gain control system to compensate for strong signal conditions.

It is also an object of the invention to provide a new and improved time gated automatic gain control system which may be effectively combined with a noise-gated synchronizing signal separator.

It is another object of the invention to provide a noise gated combination AGC and sync separator system which does not require a threshold control.

A control system for a television receiver, constructed in accordance with the invention, employs an electron discharge device having a pair of control electrodes which are interposed in the path of the electron discharge and coupled to sources of opposite polarity video signals. The improvement comprises a voltage source which presents a potential of positive polarity and has a magnitude that increases with the strength of the video signal and a biasing network for the electrode that receives the negatively polarized video signal. This biasing network includes a voltage dependent resistor which is coupled to the aforesaid voltage source.

The features of this invention which are believed to be novel are set forth with particularity in the appended claims. The invention, together with further objects and advantages thereof, may best be understood, however, by reference to the following description taken in conjunction with the accompanying drawing which is a schematic diagram of a television receiver including a control system constructed in accordance with one embodiment of the invention.

The television receiver shown in the drawing comprises an antenna 10 coupled to a radio-frequency amplifier 11 which, in turn, is coupled to a heterodyning stage or first detector 12. Detector 12 is coupled to an intermediate-frequency amplifier 13 which may include any desired number of stages. The IF amplifier is coupled to a second detector stage, enclosed within the dashed outline 14, by means of a transformer 15. The second detector circuit comprises a diode 16 having its cathode connected to one terminal of the secondary winding of transformer 15, the other terminal of the transformer secondary being grounded. The anode of diode 16 is bypassed to ground for intermediate-frequency components by means of a capacitor 18; the anode of the diode is also coupled to the control electrode 19 of an amplifier tube 20 by means of a peaking coil 21 and a coupling coil 22. Control electrode 19 of the amplifier is returned to ground through a circuit comprising coil 22 and a resistor 23.

Tube 20 constitutes the amplifying device of a video amplifier circuit 26 of generally conventional construction and includes a cathode 27 which is connected to ground or reference potential. The suppressor electrode 30 of the amplifier tube is also maintained at ground potential by virtue of a direct connection to cathode 27. The screen electrode 31 is connected to a source of positive unidirectional operating potential B+ through a pair of series connected resistors 32 and 33, resistor 33 being bypassed to ground by a capacitor 34. The anode 35 of tube 20 is connected to a D.C. source B+ through a series circuit comprising the primary winding 36 of a transformer 37, a peaking coil 38, and a load resistor 39. A contrast control potentiometer 40 and a series connected capacitor 41 are shunted across coil 38 and resistor 39. The adjustable tap on control 40 is coupled through a capacitor 42 to the cathode 43 of an image reproducer 44.

A capacitor 45 is connected across transformer primary 36 to form a parallel resonant circuit which is tuned to a frequency corresponding to the difference between the video signal carrier frequency and the sound signal carrier frequency to derive intercarrier sound signals which are applied to the audio circuits 46 of the television receiver through the secondary 47 of transformer 37. Audio circuits 46 may include a suitable audio detector and an audio amplifier of any number of stages, the output of which is connected to a loudspeaker 48.

The television receiver further includes a gain control and synchronizing signal separation system which is shown within dashed line enclosure 50. System 50 is coupled to second detector 14 and to video amplifier 26. The AGC potentials developed in system 50 are supplied to radio-frequency amplifier 11 and to IF amplifier 13. An additional output circuit of system 50 is coupled to a conventional horizontal and vertical sweep generating system which is represented in block diagram form and identified by reference number 51. Sweep generating system 51 is provided with horizontal and vertical output terminals 52, 53 which are connected, respectively, to the horizontal and vertical deflection coils 54, 55 of image reproducer 44.

As thus far described, the television receiver is entirely conventional; accordingly, only a brief description of its operational characteristics is presented here. A transmitted signal intercepted at antenna 10 is amplified in RF amplier 11 and applied to first detector 12 wherein the signal is heterodyned to a suitable intermediate frequency. The IF signal is amplified in circuit 13 and applied to second detector 14 through transformer 15. Second detector 14 develops a negative-polarity composite video signal which is utilized to control the operation of tube 20 in video amplifier 26. The amplified composite video signal appearing at anode 35 of tube 20 which, of course, is inverted in phase with respect to the input signal from detector 14, is applied to cathode 43 of the picture tube to intensity modulate the electron beam of image reproducer 44 in the usual manner. The intercarrier sound signal is developed in tuned circuit 36, 35 and then supplied to audio system 46, 48 and there utilized to reproduce the sound portion of the television broadcast. The synchronizing signal components of the composite video signal are separated in system 50 and applied to the sweep signal generating circuit 51. The generated scanning signals are, in turn, supplied to deflection coils 54, 55 to control deflection of the electron beam across the screen of picture tube 44. Circuit 50 also generates AGC potentials which are applied to amplifiers 11 and 13 to control the amplitude level of the IF signal supplied to detector 14.

The AGC and sync separator system 50 comprises an electron discharge device 60, preferably constructed as a semi-divided pentode of the type commercially available under the designation 6HS8. Tube 60 includes a cathode 61, a first control electrode 62, a screen electrode 63, a pair of individual additional control electrodes 64 and 66, and a pair of anode or output electrodes 65 and 67. The anodes 65 and 67 are individually associated with control electrodes 64 and 66, respectively. Tube 60 thus comprises two distinct and distinguishable electron discharge systems; a gain control system 68 which includes electrodes 61–65 and a synchronizing signal separation system 69 comprising electrodes 61–63, 66 and 67. The cathode, first control and screen electrodes are common to the two systems.

Cathode 61 is returned to ground through an adjustable resistor 70 which is bypassed to ground by a capacitor 71. First control electrode 62 is coupled to second detector 14 by means of a series RC circuit comprising a resistor 72 and a coupling capacitor 73. Control electrode 62 is also connected to a biasing source, the junction of the B+ voltage divider resistors 32, 33 in the screen circuit of video amplifier 20, through a current limiting resistor 74 and a voltage dependent resistor (VDR) or varistor 76, i.e., an impedance the resistance of which varies inversely with the voltage applied thereacross. Screen electrode 63 is connected to a source of B+ through a resistor 78 and is bypassed to cathode 61 via capacitor 79.

Control electrode 64 of AGC system 68 is coupled through a resistor 80 to the output circuit of video amplifier 26 through a voltage and signal dividing network, more particularly, to the junction of a pair of resistors 81, 82, which, together with a third resistor 83, are series connected between the upper terminal of contrast control 40 and ground. Network 81–83 serves not only to couple the video amplifier output to electrode 64 but also as a source of D.C. bias for that electrode. Resistor 80 serves principally as a deterrent to parasitic oscillation of tube 60.

Since screen electrode 63 is, in effect, a plate electrode by virtue of the fact that it collects substantially all of the space charge current for both sections of tube 60, any potential change on electrode 62 affects the space charge current to screen electrode 63 which, in turn, alters the cathode bias potential developed across resistor 70. More particularly, as the voltage on control electrode 62 increase positively due to an increase in video screen 31 potential, the voltage developed across cathode resistor 70 also increases positively. However, if AGC system 68 is to operate properly, the D.C. potential difference between control electrode 64 and cathode 61 must remain substantially the same. Accordingly, a bias compensating resistor 84 is connected between the juncture of resistors 74, 76 and that terminal of resistor 80 remote from electrode 64 to enable electrode 64 also to follow the bias changes coupled to electrode 62 from the screen circuit of video amplifier 20.

A resistor 85 is connected between the junction of video screen resistors 32, 33 and the juncture of resistors 80, 84 in order to compensate AGC system 68 for changes in video amplifier screen voltage due to variations in the average level of the detector output. These variations are attributable to gradations in the black and white content of the video signal. Resistor 85 couples such video screen voltage changes to control electrode 64. The purpose of this compensating arrangement is to insure that AGC system 68 responds only to changes in signal strength.

In order to prevent the relatively low impedance of the video output circuit from loading video screen 31, a D.C. decoupling network comprising a resistor 86, shunted by a capacitor 92, is serially connected between the high potential terminal of resistor 82 and the junction of resistors 80, 85.

Anode 65 of the gain control system 68 is connected to the juncture of a pair of resistors 87, 88 which are connected between B+ and ground. These resistors constitute a voltage divider which determines, to some extent, the operating potential for anode 65. The anode potential resulting from this circuit alone, however, is of such a low level that it does not induce current flow to anode 65. Pulsed excitation potential is also provided for anode 65 though an A.C. coupling system comprising a capacitor 89 which couples anode 65 to the horizontal sweep generator included in system 51. With this energizing arrangement, the anode-cathode potential supports current flow to anode 65 only during the application of sync pulses to the anode, as is customary in time-gating practice. Anode 65 is also connected to RF amplifier 11 and IF amplifier 13 by means of an integrating circuit comprising a series resistor 90 and a capacitor 91 which is returned to ground.

The control electrode 66 of sync separation system 69 is coupled to the juncture of resistors 83, 81 in the output circuit of video amplifier 20 through a coupling capacitor 94 and a parallel RC time constant circuit comprising a resistor 95 and a capacitor 96. Control electrode 66 is also provided with a suitable unidirectional operating potential by a connection to screen electrode 63 through resistor 97. Anode 67 of sync separation system 69 is coupled to the sweep generating system 51 by means of a capacitor 98 and to a source of B+ by means of the resistor 99.

In operation, circuit 50 is in many respects similar to the noise gated AGC and sync separation circuits now in use in the television industry and described in the aforementioned Adler et al. patent. Specifically, negative-polarity composite video signals are applied to first control electrode 62 from second detector 14; the positive bias potential on control grid 62 is established at a level such that the electron stream of tube 60 is cut-off in the presence of high amplitude noise impulses but not by the synchronizing signal components of the received composite video signal. Consequently, both sections of tube 60 are noise gated, i.e., cut-off by high amplitude noise contained in the received signal.

Both the A.C and D.C components of the positive polarity composite video signal appearing at anode 35 of the video amplifier tube are supplied to electrode 64 of AGC system 68 in time coincidence with the negative polarity signal applied to control electrode 62. Control electrode 64 is biased negatively with respect to cathode 61 by virtue of the fact that it is returned to a lower D.C. potential than the potential developed across cathode resistor 70. Since, as previously pointed out, the operating potential applied to anode 65 of the AGC system is not sufficient to render the system conductive, this portion of tube 60 conducts only during the application of positive sync pulses to anode 65 from the generating system through coupling capacitor 89 of the time gating circuit. Consequently, the AGC system operates as a time-gated noise-gated clipping amplifier and under normal operating conditions is conductive only during time intervals coincident with the synchronizing signal portions of the composite video signal. The output signal from anode 65, which comprises pulses having an amplitude level determined by the amplitude of the synchronizing portions of the composite video signal, is integrated by circuit 90, 91 to develop the gain control potential. This potential is applied to RF amplifier 11 and IF amplifier 13 to control the gain of those stages of the receiver in conventional fashion. Accordingly, the amplification level of amplifiers 11 and 13 is adjusted inversely in accordance with received signal strength to maintain the signal level to detector 14 within a relatively narrow range in spite of variations of received signal strength.

The A.C. components of the positive polarity composite video signal are applied via capacitor 94 to second control electrode 66 of sync separation system 69, again in time coincidence with the negative polarity signal supplied to common control electrode 62. The coupling impedances in the input circuit to control electrode 66 are selected to afford a self-bias potential which is slightly negative with respect to cathode 61; consequently, sync separation system 69 also operates as a clipping amplifier and develops a control signal comprising pulses representative of the phase and frequency of the sync components of the composite video signal. This synchronizing control signal is coupled through capacitor 98 to sweep generating system 51 to control the phase and frequency of the vertical and horizontal frequency scanning signal circuits.

Time gating of the AGC and sync separation systems affords a substantial advantage in operation of the television receiver in that the control signals are more effectively immunized from the effects of changes in video modulation level than is possible in systems which depend solely upon adjustment of the clipping level of an amplifier. At the same time, however, it is possible for the AGC system 68 and sync separator 69 to be paralyzed under circumstances in which the bias for control electrode 62 is adjusted for optimum weak signal operation and the receiver is switched to a channel which affords a relatively strong signal.

More particularly, in the presence of a relatively strong signal at the output of second detector 14, conduction in video amplifier tube 20 is correspondingly low. As a result, the screen electrode 31 of tube 20 rises to a high average positive potential. Under weak signal conditions, on the other hand, a substantially greater discharge current flows in tube 20, materially reducing the average positive potential on the screen electrode. Consequently, the biasing potential for control electrode 62 of tube 60 varies directly with variations in the average amplitude of the positive-polarity composite video signal developed by tube 20 since the relatively high frequency components of the positive polarity composite video signal are bypassed to ground through capacitor 34. Paralysis occurs when the amplitude of the negative polarity signal applied to control grid 62 from detector 14 is sufficient to drive tube 60 into cut-off, notwithstanding the compensation afforded by the rising screen electrode potential of the video amplifier.

In accordance with the present invention, however, this paralysis condition is prevented by including voltage dependent resistor 76 in the bias circuit for electrode 62 and returning it to a source of positive potential which varies with signal strength, specifically, screen electrode 31 of video amplifier tube 20. The rise in video amplifier screen potential, which accompanies a strong negative output from detector 14, increases the voltage across VDR 76. Instantly the resistance of VDR 76 is reduced to a fraction of its previous value thus permitting control electrode 62 to draw grid current and prevent cut-off. Simultaneously, conventional AGC action is instituted by system 68 to develop a control signal which reduces the gain of amplifier stages 11, 13, which, in turn, reduce the output of detector 14.

With the control exercised by VDR 76 the parameters of the biasing circuit for electrode 62 can be selected to provide optimum performance under weak signal conditions without fear that a strong incoming signal will drive tube 60 into cut-off. Even when the receiver is located within the strong signal area of one channel but is required to operate in the fringe area of another channel, the instantaneous response of VDR 76 compensates for such widely divergent operating conditions. Moreover, in a combined AGC and sync separator system of the type herein considered, in which both functions are subject to a common control electrode, the subject control system improvement also prevents loss of synchronism attributable to fluctuating signal strength conditions. This improvement is relatively simple and economical and requires a minimum of components thereby materially enhancing the competitive position of the receiver in which it is included.

While a biasing arrangement for electrode 62 other than that shown can be employed, e.g., a grounded cathode, it is principally VDR 76 and the video screen potential which determine the operating bias for control electrode 62. More particularly, the value of VDR 76 is predetermined so that, under weak signal conditions, control electrode 62 draws sufficient current too establish electrode 62 slightly positive with respect to cathode 61. Thereafter, under strong signal conditions and in response to a rising video screen voltage, VDR 76 assumes a resistance substantially less than its predetermined value to permit electrode 62 to draw sufficient current to maintain AGC and sync separator amplifier 60 conductive.

In order to afford a more complete and specific illustration of the invention, suitable impedance values and other circuit parameters for an AGC and sync separator system constructed in accordance with the embodiment of the invention illustrated in the drawing are set forth hereinafter. It should be understood that this material is included solely by way of illustration and in no sense as a limitation of the invention.

| | | |
|---|---|---|
| Tube 20 | | ½ 6JT8 |
| Tube 60 | | 6HS8 |
| B+ | volts | 265 |
| Resistor 32 | kilohms | 3.9 |
| Resistor 33 | do | 22 |
| Resistor 72 | do | 39 |
| Resistor 74 | do | 180 |
| Resistor 76: Globar Type 331 BNR Varistor 1 megohm at .050 ma. 630 kilohms at .100 ma. 400 kilohms at .200 ma. | | |
| Resistor 78 | kilohms | 22 |
| Resistor 80 | do | 1 |
| Resistor 81 | do | 82 |
| Resisitor 82 | do | 15 |
| Resistor 83 | do | 27 |
| Resistor 84 | megohms | 1.8 |
| Resistor 85 | kilohms | 820 |
| Resistor 86 | do | 150 |
| Resistor 87 | megohms | 3.3 |
| Resistor 88 | kilohms | 820 |
| Resisitor 95 | do | 470 |
| Resistor 97 | megohms | 8.2 |
| Potentiometer 70 | kilohms maximum | 10 |
| Capacitor 34 | microfarads | 4 |
| Capacitor 71 | do | 4 |
| Capacitor 73 | do | .01 |
| Capacitor 79 | do | .1 |
| Capacitor 89 | do | .001 |
| Capacitor 92 | do | .01 |
| Capacitor 94 | do | .0033 |
| Capacitor 96 | micromicrofarads | 220 |

While a particular embodiment of the present invention has been shown and described, it is apparent that changes and modifications may be made therein without departing from the invention in its broader aspects. The aim of the appended claims, therefore, is to cover all such changes and modifications as fall within the true spirit and scope of the invention.

I claim:

1. In a control system for a television receiver of the type which employs an electron discharge device having a pair of control electrodes interposed in the path of the electron discharge and coupled to sources of opposite polarity video signals, the improvement comprising:

a voltage source which presents a potential of positive polarity and of a magnitude that increases with the strength of said video signal;

and a biasing network for the one of said electrodes that receives said video signal with negative polarity including a voltage dependent resistor coupled to said voltage source.

2. In a control system for a television receiver of the type which employs an electron discharge device having a pair of control electrode interposed in the path of the electron discharge and coupled to sources of opposite polarity video signals, the improvement comprising:

a voltage source which presents a potential of positive polarity and of a magnitude that increases with the strength of said video signal;

and a biasing network, including a voltage dependent resistor, coupled between the one of said electrodes that receives said video signal with negative polarity and said voltage source.

3. In a control system for a television receiver of the type which employs an electron discharge device having a pair of control electrodes interposed in the path of the electron discharge and coupled to sources of opposite polarity video signals, the improvement comprising:

a voltage source which presents a potential having a positive polarity and a magnitude within a certain range for normal operating conditions of said receiver but having a value in excess of said range in the presence of a predetermined abnormal operating condition of said receiver;

and a biasing network for the one of said electrodes that receives said video signal with negative polarity including a voltage dependent resistor connected to said voltage source, said voltage dependent resistor having a predetermined value of resistance for potentials within said range but having a resistance substantially less than said predetermined value for potentials in excess of said range.

4. In a control system for a television receiver of the type which employs an electron discharge device having a pair of control electrodes interposed in the path of the electron discharge and coupled to sources of opposite polarity video signals, the improvement comprising:

an amplifier having a positively biased electrode the operating potential of which increases with the strength of said video signal;

and a biasing network for the one of said electrodes that receives said video signal with negative polarity including a voltage dependent resistor coupled to said amplifier electrode.

5. In a gain control system for a television receiver of the type which employs an electron discharge device having a pair of control electrodes interposed in the path of the electron discharge and coupled to sources of opposite polarity video signals, the improvement comprising:

an amplifier having a positively biased electrode the operating potential of which has a magnitude within a certain range for normal operating conditions for said gain control system but having a value in excess of said range in the presence of a predetermined abnormal operating condition of said receiver which, in effect, disables said gain control system;

and a biasing network for the one of said electrodes that receives said video signal with negative polarity including a voltage dependent resistor connected to said amplifier electrode, said voltage dependent resistor having a predetermined value of resistance for potentials within said range but having a resistance substantially less than that of said predetermined value for potentials in excess of said range.

6. In a gain control system for a television receiver of the type which employs an electron discharge device having a pair of control electrodes interposed in the path of the electron discharge and coupled to sources of opposite polarity video signals, the improvement comprising:

a voltage source which presents a potential having a positive polarity and a magnitude within a certain range for normal operating conditions of said gain control system but having a value in excess of said range in response to a sudden increase of said video signal to a value sufficient to bias said electron discharge device to cut-off;

and a biasing network for the one of said electrodes that receive said video signal with negative polarity including a voltage dependent resistor connected to said voltage source, said voltage dependent resistor having a predetermined value of resistance for potentials within said range but having a resistance for potentials in excess of said range lower than that of said predetermined value and effective to render said electron discharge device highly conductive.

7. In a television receiver having a video detector for developing a negative-polarity composite video signal, a video amplifier coupled to said video detector for developing an amplified positive-polarity composite video signal, said video amplifier comprising an electrode whose D.C. operating voltage varies directly with the strength of said composite video signal, and a noise-gated synchronizing signal separator and automatic gain control system having input terminals coupled to said video amplifier for receiving said positive-polarity composite video signal and a noise-gating element coupled to said video detector for receiving said negative-polarity composite video signal and adapted to momentarily disable said synchronizing signal separator and automatic gain control signal in the presence of large amplitude extraneous noise impulses, said electrode of said video amplifier being direct coupled to said noise-gating element to apply a stronger positive bias to said noise-gating element under strong signal receiving conditions than under weak signal receiving conditions thus tending to stabilize the operation of said synchronizing signal separator and automatic gain control system within a predetermined range of received signal strengths, but said noise-gated synchronizing signal separator and automatic gain control system being subject to paralysis upon switching from a weak signal receiving condition to a strong signal receiving condition beyond said predetermined range, the improvement which comprises a voltage dependent resistor, having a resistance which varies inversely with the applied voltage, included in said direct coupling from said electrode of said video amplifier to said noise-gating element of said synchronizing signal separator and automatic gain control system, for preventing paralysis of said system under all signal receiving conditions.

References Cited by the Examiner

UNITED STATES PATENTS

| | | | |
|---|---|---|---|
| 2,834,877 | 5/1958 | Milwitt | 325—415 |
| 3,005,870 | 10/1961 | Ruby et al. | 178—7.3 |

OTHER REFERENCES

"I.R.E. Dictionary of Electronics Terms and Symbols," published by the Institute of Radio Engineers, Inc. (New York) 1961 (pages 161 and 221 relied on).

DAVID G. REDINBAUGH, *Primary Examiner.*

J. McHUGH, *Assistant Examiner.*